United States Patent [19]

Goldberg

[11] 3,862,030

[45] Jan. 21, 1975

[54] MICROPOROUS SUB-MICRON FILTER MEDIA

[75] Inventor: Bruce S. Goldberg, Clifton, N.J.

[73] Assignee: Amerace Esna Corporation, New York, N.Y.

[22] Filed: Dec. 13, 1972

[21] Appl. No.: 314,654

[52] U.S. Cl................... 210/24, 210/65, 210/496, 210/500 M, 210/501, 260/2.5 M, 264/41, 264/49
[51] Int. Cl............................................. B01d 39/00
[58] Field of Search ........... 210/490, 496, 493, 500; 106/122; 264/41, 49; 260/2.5 M, 2.5 F

[56] References Cited
UNITED STATES PATENTS

| | | | |
|---|---|---|---|
| 2,772,322 | 11/1956 | Witt et al. | 260/2.5 M |
| 3,520,416 | 7/1970 | Keedwell | 210/493 |
| 3,615,024 | 10/1971 | Michaels | 210/490 |

*Primary Examiner*—Frank A. Spear
*Assistant Examiner*—Ferris H. Lander

[57] ABSTRACT

Microporous fluid-permeable filter media are provided which are especially adapted for removing microscopic or ultrafine particles of sub-micron size from the medium in which they are suspended. The microporous fluid-permeable sub-micron filter media of the present invention comprise a polymeric resinous matrix having an inorganic filler dispersed throughout the resinous matrix, and a network of micro-voids or pores formed in the resinous matrix, between the particles of dispersed filler and the resinous matrix, and between neighboring particles of the filler with the size distribution of such pores being relatively non-uniform.

32 Claims, 1 Drawing Figure

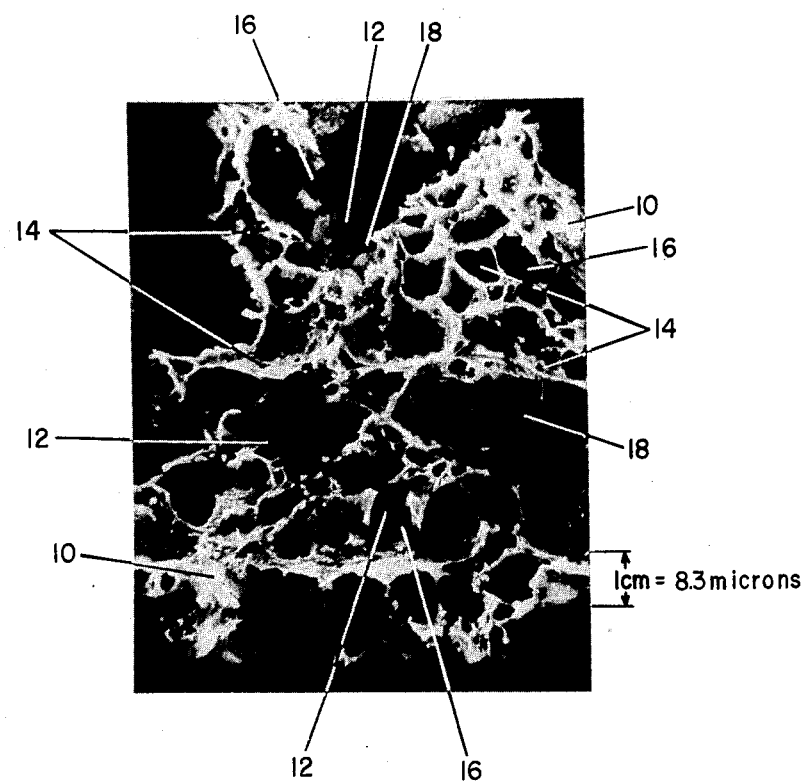

MICROPOROUS SUB-MICRON FILTER MEDIA

The present invention relates generally to microporous filter media, and more particularly to microporous fluid-permeable filter media suitable for removing ultra-fine or microscopic particles from the medium in which they are suspended. Without limiting the present invention, the filter media disclosed hereinbelow are especially adaptable for removing sub-micron sized particles such as for example, bacteria, colloidal substances, and the like, from the liquid or gas environments they are usually suspended in. The size of such filtered particles is nominally 1 micron or less when measured with respect to the particle's least filterable diameter. Thus, for example, if a particle is elongated or oblong in shape, its least filterable diameter will correspond to the length of the particle's minor axis rather than its major axis. Accordingly, the term "sub-micron" as used herein will be understood to mean a filtered particle whose least filterable diameter is nominally 1 micron or less.

Prior filter media capable of functioning in the sub-micron regime can usually be classified in one or two categories i.e., they are either "surface-type" filters or they are "depth-type" filters. The surface-type filters generally speaking are thin films or membranes having pores of substantially the same size and configuration extending from one surface of the filter element to the other and essentially function by entrapping the suspended material in the fluid or gas passing through the filter element on the upstream of the film or membrane. Surface-type membrane filters having ultrafine or microsized pores are disclosed, for example, in the following U.S. Pat. Nos. 1,421,341 (Zsigmondy); 1,693,890 and 1,720,670 (Duclaux); 2,783,894 (Dovell et al); 2,964,777 (Robinson); and 2,944,017 (Cotton). While it is true that the membrane surface-type filters are capable of providing a filter element having extremely fine pore size and relatively uniform pore size distribution they must be extremely thin and accordingly, are very costly to manufacture. Moreover, due to their extreme thinness they have relatively poor physical strength requiring careful handling and furthermore, they are structurally unstable when exposed to heat.

Microporous depth-type filters in contrast usually have an appreciable thickness with a series of pores of distinct length; hence, they are less fragile than the membrane surface-type filters. Depth-type filters function by entrapping the suspended particles or contaminant within the filter element itself, i.e., along the longitudinally extended interior wall surfaces of the pores respectively. Depth-type filters capable of removing sub-micron sized particles may be fabricated on the one hand from ceramic materials which are bulky, brittle and very expensive, or on the other hand from bats or sheets made up of masses of fibers or other particulate material held together by mechanically interlocking several layers of such material, or by bonding the several layers together, or by bonding a layer of such material to a permeable substrate. Examples, of the latter type depth-filter may be found in the following U.S. Pat. Nos. to Pall et al. 3,258,056; 3,246,767; and 3,353,682. Although the microporous depth filters exemplified by the Pall et al. patents are generally less expensive to fabricate and easier to handle than the ceramic filters, and are considerably less fragile and sensitive to heat compared to the membrane surface-type filters, nonethless they still suffer from certain disadvantages owing to the inherent nature of their construction. For example, since they are composed of many fibers or granuals of particulate material, the prior depth-filters are quite susceptible to surface abrasion with the result that the particles of the filter material itself can frequently be broken off and entrapped within the filter element leading to early clogging and termination of the filter's useful life. Alternatively, the abraded particles of filter material are able to work their way downstream of the filter element resulting in a contamination of the filtrate medium. Another disadvantage of the prior depth-type filters is that because the filtered material is occluded within the filter element it is difficult, if not impossible, to clean such filter elements by back-flushing. In addition, depth-type filters cannot normally be used to filter bacteria inasmuch as the bacteria will be occluded or entrapped within the filter material itself rather than being collected on the surface thereof. This prevents easy sampling of the filtered bacteria for purposes of analysis. Moreover, since bacteria are active living organisms, they have been found capable of working their way completely through the depth-type filter leading to contamination of the filtrate.

Against the foregoing background it is a primary objective of the present invention to provide improved microporous filter media capable of efficiently removing sub-micron sized particles from the medium in which they are suspended in.

It is another objective of the present invention to provide microporous filter media capable of filtering suspended particles of sub-micron size despite the fact that the size distribution of the pores in the microporous filter member varies non-uniformly from about 0.01 microns to about 100 microns.

It is still another objective of the present invention to provide a microporous filter element capable of removing sub-micron sized particles from the medium in which they are suspended wherein the filter element is capable of functioning as both a surface-type filter and a depth-type filter without exhibiting any of the disadvantages respectively associated with either type.

It is yet still another objective of the present invention to provide microporous filter media capable of removing sub-micron sized particles from the medium in which they are suspended wherein the filter media have improved strength properties, are easy to handle, have improved permeability, and are relatively inexpensive to fabricate.

Toward the accomplishment of the foregoing objectives and advantages, the present invention involves the preparation of a suitable microporous material and the use of such material as fluid-permeable sub-micron filter media wherein the microporous material comprises a polymeric resinous matrix having an inorganic filler dispersed throughout the matrix and a network of micro-voids or pores formed in the resinous matrix, between the particles of dispersed filler and the resinous matrix, and between neighboring particles of dispersed filler, with the size distribution of such pores being relatively non-uniform.

Additional objects and advantages as well as a more complete understanding of the invention will be more apparent from a study of the following detailed explanation of the invention in connection with the sole accompanying drawing which comprises a photomicrographic representation of the surface of the microporous filter media according to the present invention magnified about 1200x.

In accordance with the present invention the filter media contemplated herein may be fabricated from poromeric or microporous plastic sheets made from a mixture compounded from the following essential ingredients: (1) a thermoplastic resin binder, for example, resinous polyvinyl chloride; (2) a solvent e.g., cyclohexanone, which serves to plasticize or solubilize the resin binder as well as help form some of the pores; (3) an inorganic filler such as silica hydrogel or precipitated hydrated silica, or any other carrier or substrate for volatile matter which serves to capture a controlled amount of volatile matter whereupon the volatile matter may later be removed under controlled conditions to leave behind the desired system of micropores as will be more fully explained below; and (4) a volatile non-solvent pore former such as water which is capable of being absorbed by the inorganic filler.

In practicing the invention, it is preferable to employ a vinyl chloride resin binder of the "EP" or "easy processing" type. An EP resin is characterized by resin particles which are porous and highly absorbent, as compared to commercial resin particles having a hard glossy beaded appearance. A good example of a suitable thermoplastic resin binder is a nonplasticized, gamma vinyl chloride homopolymer resin such as that commercially available from B. F. Goodrich Company under the trademark Geon 103 EP. The vinyl chloride resin binder may also be a copolymer of vinyl chloride and a small amount (for example up to about 15%) of a monoethylenic monomer, i.e. vinyl acetate, vinylidene chloride, propylene, or ethylene. Exemplary copolymers of the latter type suitable for use with the present invention may be a propylene modified vinyl chloride resin such as that commercially available from the Air Products Company under the trademark Airco 401, or a vinyl acetate modified vinyl chloride resin also commercially available from Air Products Company under the trademark Escambia 6240. Obviously, other thermoplastic resinous binders could also be used as will occur to those skilled in the art as long as the thermoplastic resin is a material which (1) can be converted to a doughy, semi-plasticized state with the aid of a solvent so as to be readily capable of shaping by extrusion or calendering while in this semi-plasticized state, and which then, upon removal of solvent and consequently deplasticization, retains the resulting shape at whatever temperature it is ultimately intended to function; and (2) which is chemically and physically stable under the conditions of intended use, that is, if it is intended to function as filter media the resin should resist attack by the fluids or gases within which it will be used, it should be tough and have adequate tensile strength, and it should be able to withstand the ambient termperatures under which the filter media are expected to be used and function.

Instead of silica hydrogel or precipitated hydrated silica, the filler material can be any other relatively insoluble, inorganic solid capable of holding at least 30 parts water or other volatile matter per 100 parts nonvolatile material and be capable of releasing such volatile matter upon heating to an appropriate temperature below the decomposition point of the thermoplastic resin used in the process. In this manner, dehydration or devolatilization and shrinkage of the filler material in the semi-rigid deplasticized sheet brings about the formation of the desired system of micropores within the sheet. Among the more readily available filler materials capable of meeting the foregoing requirements are aluminum hydroxide, ferrous hydroxide, hydrated absorbent clays or diatomaceous earths, borax and acetyl salisylic acid. Of course, the material should be one which is not readily extracted from the extruded or calendered plastic sheet during the solvent removal phase of the process.

The solvent employed should have an appreciable solvating or plasticizing action on the resinous binder (e.g., the polyvinyl chloride) and should be capable of being readily absorbed by the filler material (e.g., silica). In general, organic solvents are preferred. Typical organic solvents which can be suitably employed include acetone, ethers, dimethyl formamide, orthoclorobenzene, nitrobenzene, tetrahydrofuran and such ketones as methyl cyclohexanone, methyl ethyl ketone, and methyl isopropyl ketone. Cyclohexanone is a particularly preferred solvent since it is capable of properly plasticizing polyvinyl chloride and is only slightly soluble in water. Moreover, it has the capacity of being readily absorbed by silica and has a sufficiently high boiling point allowing for plasticization and extraction at temperatures above room temperature.

In one preferred method of preparing the fluid-permeable microporous filter media of the present invention, the thermoplastic resinous binder and the inorganic filler material (both the binder and the filler are preferably in the form of finely divided particles) are blended together in a dry mixer or blender at room temperature or above. After a homogeneous pulverulent mixture is obtained a solvent for the resin (e.g., cyclohexanone) is added in an amount sufficient to form a kneadable coherent dough capable of being formed into a uniform substantially flattened sheet of desired thickness by extrusion, calendering, or other suitable molding or forming methods. Accordingly, solvent in an amount ranging from about 1.5 to about 3 parts per part of resin by weight can be employed with a range of about 2 to 2.7 parts per part of resin being particularly preferred. It will be noted that when the filler material comprises precipitated hydrated silica, preferred quantities of a non-solvent (water) will also be added to the blend during formation of the dough. Alternatively, silica hydrogel may be used instead of precipated hydrated silica in which case the non-solvent (water) will already be contained as absorbed matter in the silica component (i.e., silica hydrogel generally comprises silica with from about 50% to about 75% absorbed water).

In another alternatively preferred method of preparing the fluid-permeable microporous filter material of the present invention, the filler may comprise precipitated hydrated silica such as is commercially available, for example, from PPG Corporation under the trademark Hi Sil 233, which latter may be mixed with the vinyl chloride resin binder, the solvent, and preferred quantities of non-solvent (water) in a low-shear mixing device or blender without the addition of heat to form a damp, stable, free-flowing powder rather than a dough. The powder may then be placed in an extruder wherein under conditions of high shear forces and moderately increased temperatures converted into a dough capable of subsequently being calendered or otherwise molded to form a uniform sheet as described above. The foregoing method of forming a damp, flowable powder rather than a dough, and the advantages achieved compared to forming the dough directly are more fully explained in U.S. Pat. No. 3,696,061 entitled "Method for Forming Flowable Powder Processable Into Microporous Object", of which I am co-inventor along with Messrs. J. Q. Selsor and E. W. Turner, said patent and the instant application being assigned to a common assignee. The disclosure contained in the aforementioned U.S. No. 3,696,061 is hereby incorporated herein by this reference.

In either event, the resulting sheet is then directly introduced into an extraction liquid or bath which is capable of extracting the solvent from the formed sheet and of replacing the solvent in the sheet with the extracting liquid without appreciable dissolving or swelling of the resinous binder matrix in the sheet. Thus, for example, the calendered or molded sheet may be placed on a transport screen or other suitable carrier means and passed through an extraction bath containing water having a temperature ranging from about 120° to about 180° F. Depending upon the thickness, concentration gradient, bath temperature, type of solvent, and other factors, the sheet is maintained in the extraction bath until substantially all the solvent has been leached or removed from the sheet and replaced therein by the extraction liquid (e.g., water). The extracted microporous sheet is then dried to remove the extraction liquid, say, for example, by passing the extracted sheet through a dry air oven having a temperature ranging from about 150° to abaout 300° F thereby evaporating the extraction liquid from the sheet. Removal of the extraction liquid from the sheet together with the silica or filler particles shrinking in volume since they now no longer retain any absorbed solvent or any of the extraction liquid (which subsequently had replaced the solvent during extraction thereof) results in the formation of a dimensionably stable microporous system within and throughout the sheet. Once the micropore structure has been formed, the dried, dimensionably stable sheet may then be cut to the size and configuration desired for use as filter media, preferably after the sheet has cooled to room temperature.

The nature of the microporous system formed in the foregoing manner may be better understood by referring to the drawing which as mentioned is a representation of a photomicrograph taken at a magnification of 1200x of the surface of a typical sample of the microporous filter media of the present invention. As indicated in the photomicrographic representation, the deplasticized polymeric resinous binder forms a dimensionably stable matrix 10 throughout which particles 12 of the silica filler material as dispersed. As may be clearly observed in the photomicrographic representation the micropores are present in the form of (1) voids 14 extending throughout the matrix 10 itself, (2) voids 16 extending between the silica particles 12 and the matrix 10, and (3) voids 18 extending between adjacent or neighboring silica particles 12. In addition, it will be noted that the size of the individual pores or voids 14, 16 and 18 vary over a relatively wide distribution. For example, by employing the well known Mercury Intrusion Method of porosimetrically determining pore size and pore size distribution, it is not unusual to find in a typical example of the microporous filter material of the present invention, pores or voids ranging in size from about 0.01 microns to approximately 100 microns and a mean pore diameter of about 0.1 microns. Moreover, it will be noted that this random distribution of varying sized pores extends not only in the two dimensions indicated in the photomicrographic representation, but extends along the third dimension or thickness dimension of the microporous filter material i.e., assuming the sample depicted in the drawing has a finite thickness "t" running perpendicular to the plane of the drawing, the random distribution of pore or microvoid size will vary in a like manner along the t dimension. Thus, the filter media of the present invention may be characterized as a layer of microporous material having a thickness t comprising a plurality of surfaces such as that represented in the photomicrograph of the drawing susperposed and integral with respect to each other wherein each surface includes a random distribution of pores or voids of varying size. This results therefore, in the provision of a microporous filter element which instead of having distinct pores of relatively uniform size extending from one surface of the filter element to its other surface, actually comprises a multitude of tortuous pathes whose respective lengths are many times greater than the thickness t of the element and whose respective diameters vary randomly along their length. It is believed that for this reason, the microporous sub-micron filter media of the present invention are capable of efficiently filtering or removing suspended matter such as bacteria, for example, from the fluid or gas medium in which such matter is suspended despite the fact that the pore size of the microvoids contained in the filter media vary over a relatively large distribution and include a substantial number of pores greater in size than the particle size of the matter being filtered.

Another way of characterizing the sub-micron filter media of the present invention is that of a microporous filter element consisting of a "depth-type" filter made up of a finite plurality of integrated superpositioned "surface-type" filter layers with each layer having a random distribution of non-uniformly sized microvoids or pores. The advantage of this construction is that the filter element of the present invention is capable of functioning as a surface-type filter and yet possesses the improved structrual and physical strength characteristics of a depth-type filter. Thus, for example, when used to filter bacteria or similarly sized suspended particles it has been observed that a preponderance of the latter are entrapped on the leading or upstream surface of the filter element according to the present invention, and any bacteria or other such particles which do manage to work their way below the leading surface of the element due to the randomly wide size distribution of the pores therein are entrapped or occluded immediately below the surface of the filter element. Hence, the present filter media may be used to precisely filter out sub-micron sized particles, such as bacteria, for example, when heretofore it was totally unexpected that particles of this size and nature could be removed with any form of filter other than the thin film or membrane type "surface-filter" having a nearly uniform pore size distribution. The foregoing construction furthermore enables the filter element to be cleaned by back flushing thereby extending the useful life thereof.

The present invention now will be further described with reference to the following examples thereof, which latter are for illustration purposes only and are not to be construed as limiting the scope of the invention.

EXAMPLE 1

Sub-micron filter media according to the present invention were fabricated utilizing the following procedure. A microporous sheet was prepared by dry blending 35.0 lbs. of Hi Sil 233, a precipitated hydrated silica, and 25.0 lbs. of Geon 103 EP F10 polyvinyl chloride resin having a particle size of about 20% through a 140 mesh screen in a Patterson Kelly "low-shear" liquids-solids blender for approximately 3 minutes. Thereafter, and during continued agitation 50.5 lbs. of solvent (cyclohexanone) were added over a 20 minute period by means of a pump. Water in an amount of 48.2 lbs. was then added to the mix in the agitating blender over a subsequent 20 minute period to form a damp, free flowing, powder. The powder was then introduced into a screw extruder having a barrel temperature of approximately 120°F, and passed between the rolls of a calender to obtain a substantially flat uniformly dimensioned sheet. The latter was then passed through an extraction bath of water at 170° F, and subsequently dryed in a hot air oven at 225° F for 6 minutes. From the resulting substantially flattened semi-rigid sheet, a filter element 0.018 inches thick and 47 mm in diameter was cut and heat sterilized by immersion in a steam bath for about 60 minutes. The sterilized filter element was then mounted in a filter housing, and 100 cc of water containing 800 Escherichia Coli bacteria, average size 0.5 microns in breadth and 2.5 microns in length, was passed through the above filter. The filtrate was analyzed for bacteria by count technique as well as growth via innoculation in EMB, BBL, and trypticase soy broth. In all cases no bacteria count nor was any broth growth observed. The through-put or flow-rate of the filter element was measured by conventional methods at 0.4 gallons/min/sq.ft. under a pressure gradient of 10 psig.

EXAMPLE 2

A fresh filter element was prepared following the procedures of Example 1. A suspension of 800 staphylococcus aureus bacteria (0.75 microns in average size) in 100 cc of water was then passed through the filter. The resulting filtrate was analyzed by count technique as well as innoculated into sheet entercoccus broth, trypticase soy broth and staph agar 110 broth. In all cases no bacterial count nor any growth was observed.

EXAMPLE 3

A fresh filter element was prepared in accordance with Example 1 and was used to filter 800 enterobacteria bacilli bacteria (average size 0.5 microns in breadth and 2 microns in length) in 100 cc of water. The resulting filtrate was analyzed by bacteria count and also innoculated into EMB, BBL, and trypticase soy broths. No bacterial count nor any bacterial growth was observed in the broths.

EXAMPLE 4

A fresh filter element was prepared in accordance with Example 1 and was used to filter 800 enterococci bacteria, (0.75 microns in average size) in 100 cc of water. The resulting filtrate was counted as well as innoculated into select enteroccocus, trypticase, soy broth, and staph agar 110. In all cases no bacterial count nor any growth was observed.

EXAMPLE 5

A fresh filter element was prepared in accordance with Example 1. Approximately 200 bacteria taken from each of the four bacterial varieties of Example 1-4 above (i.e., a total of about 800) were mixed together in 100 cc of water. The latter was then passed through the filter element. The resulting filtrate was innoculated into each of the broth mentioned above in Examples 1-4, respectively, and no bacterial growth was observed nor was any bacteria available for counting.

EXAMPLE 6

A fresh filter element was prepared in accordance with Example 1 and mounted in a filter housing without the benefit of sterilization. 100 cc of water having a 0.1% suspension of powdered carbon black was passed through the filter specimen under a pressure gradient of 10 psig. The resulting filtrate was viewed under a microscope and no black particles were observed.

In accordance with the present invention it has been discovered that increased flow-rate can be obtained without increasing the size limit of the smallest particles capable of being filtered and therefore without decreasing the retentative capability of the filter. One preferred method for increasing flow-rate without sacrificing retentivity is to prepare the microporous sub-micron filter media using a previously prepared quantity of reground microporous material in lieu of a portion of the combined amount of the binder and the filler ingredients during fabrication of the microporous sheet material from which the filter media may be obtained. Generally, the amount of reground microporous material which is to be added should replace from about 15% to about 30% of the original total weight of the dry ingredients, that is, of the binder and the filler. The particle size of the reground microporous material may vary within convenient limits and is not especially critical. For example, a particle size of about 90% through a 70 mesh screen has been found to be satisfactory. The following example illustrates the foregoing.

EXAMPLE 7

The same procedures employed in Example 1 were adhered to using the following ingredients in the following amounts:

| | |
|---|---|
| Resin (Geon 103 EP F 10) | 20.0 lbs. |
| Silica (Hi Sil 233) | 28.0 lbs. |
| Solvent (Cyclohexanone) | 50.5 lbs. |
| Water | 48.2 lbs. |

However, 12.0 lbs. of the microporous sheet material prepared in accordance with Example 1 and reground to a 70 mesh particle size were added to the mix in the Patterson-Kelly low-shear blender, and before the damp, powder mix was extruded, calendered into sheet form, extracted and dried. Several filter specimens 0.018 inches thick were then prepared and used respectively to filter the bacterial suspensions of Examples 1-5. In all cases no bacterial count nor any growth were observed in the resulting filtrates. The flow or through-put rate of the filter specimens made in part from regrinds of Example 1 was measured at 0.8 gpm/sq.ft. under a pressure gradient of 10 psig, or 100% greater than that of the filter media of Example 1.

In Example 1 and 7, the ratio of water to solvent was 0.955/1. It has been discovered that an increase in the amount of water relative to the amount of solvent will also increase the flow-rate of the filter media of the present invention. This is demonstrated by the following examples:

EXAMPLE 8

Utilizing the procedure following Example 1, flat sheet stock filter media 0.018 inches thick were prepared from a mix comprising 25.0 lbs. Geon 103 EP; 35.0 lbs. Hi Sil 233; 50.0 lbs. water; and 50.0 lbs. cyclohexanone (i.e., a water/solvent ratio of 1/1). The flow-rate through the resulting filter specimens was measured at 1.0 gpm/sq.ft. under a pressure differential of 10 psig.

EXAMPLE 9

The procedure of Example 8 was repeated, however, the water/solvent ratio was increased to 1.12/1 (56.2 lbs. water and 50 lbs. cyclohexanone). The flow-rate through the resulting filter specimens was measured at 2.8 gpm/sq.ft. under a pressure gradient of 10 psig.

Still more Examples illustrate that the affect on the flow-rate of the filter media prepared from a composition utilizing in part reground microporous sheet material as in Example 7, and the affect on flow-rate employing higher water/solvent ratios as in Examples 8 and 9, are cummulative.

EXAMPLE 10

Utilizing the procedure following in Example 7, flat sheet stock filter media 0.018 inches thick were prepared from a mix comprising 20.0 lbs. Geon 103 EP; 28.0 lbs. Hi Sil 233; 12.0 lbs. regrind of the microporous material of Example 1; 50 lbs. of water; and 50 lbs. of cyclohexanone (i.e., a water/solvent ratio of 1/1). The flow rate through the resulting filter media was measured at 2.0 gpm/sq.ft. under a pressure gradient of 10 psig.

EXAMPLE 11

The procedure of Example 10 was repeated, however, the water/solvent ratio was increased to 1.12/1 (56.2 lbs. of water, 50.0 lbs. cyclohexanone). The flow rate through the resulting filter specimens was measured at 3.2 gpm/sq.ft. under a pressure gradient of 10 psig.

It has been found that in general an increase in water/solvent ratio results in a decrease in the mechanical strength properties, particularly the tensile strength of the resulting filter media. Accordingly, water/solvent ratios in excess of about 1.5/1 are not recommended unless the filter media are structurally reinforced as for example by bonding a substrate or backing of a highly permeable paper, or of a woven or non-woven fibrous material to the flat sheet stock from which the filter media are prepared. Such bonding may be done by using adhesive means well known in the art, or alternatively, by directly bonding the structural backing to the microporous member directly at the calendering station.

When this is done, higher water/solvent ratios can be employed to achieve higher flow-rates since the mechanical strength sacrificed thereby can be compensated for or regained by means of a suitable backing material bonded to the microporous sheet material of the present invention. Of course, it will be appreciated that the use of a backing sheet material as disclosed herein, merely to increase the strength of the microporous filter media regardless of whether high or low water/solvent ratios are employed as hereinaforesaid, or to function as a pre-filter, is within the contemplation of the present invention.

As seen from Examples 1–6 above, efficient fluid permeable microporous sub-micron filter media may be prepared in accordance with the present invention by employing approximately 1.4 parts of filler material (silica) per part of thermoplastic resin binder by weight. This is not especially critical however, the ratios of filler to resin binder as low as about 1/1 and as high about 2/1 may be employed with satisfactory results. Thus, in filter media fabricated in accordance with the invention utilizing a 1/1 filler to binder ratio, the finished article will have a dispersed inorganic filler content of about 50% based upon weight. Similarly, when employing a 2/1 filler to binder ratio, the finished filter media will have a dispersed inorganic filler content of about 67% based upon the total weight of the filter media article. Generally an increase in the filler to binder ratio will also tend to increase the flow or through-put rate of the microporous filter media. This is so because higher proportions of the filler material vis-a-vis the polymeric binder material tend to result in increased pore size as well as greater porosity. Illustrative of the foregoing are the following examples.

EXAMPLE 12

Following the procedure of Example 1, a fresh filter element 0.018 inches thick was prepared from a mix comprising 20 lbs. Geon 103 EP, 40 lbs. Hi Sil 233, 50.6 lbs. cyclohexanone, and 63.5 lbs. water (i.e., filler/binder ratio of 2/1 and a water/solvent ratio of 1.25/1). The flow-rate through the filter specimen was measured at 9 gpm/sq.ft. under a pressure gradient of 10 psig.

EXAMPLE 13

Following the procedure of Example 1, flat sheet stock filter media 0.018 inches thick were prepared from a mix comprising 20.0 lbs Geon 103 EP, 40.0 lbs. Hi Sil 233, 59.5 lbs. water, and 54.6 lbs. cyclohexanone (i.e., a filler/binder ratio of 2/1 and a water/solvent ratio of 1.05/1). The flow-rate through the resulting filter specimens was measured at 8 gpm/sq.ft. under a pressure differential of 10 psig.

It will be noted that the increased permeability of the sub-micron filter media prepared in accordance with Example 13 is not quite as high as the permeability of the filter media prepared in accordance with Example 12. This is because, the water/solvent ratio of the latter was about 1.25/1 whereas the water/solvent ratio of the former was about 1.05/1. The foregoing indicates that increased permeability of the sub-micron filter media according to the present invention may be achieved by increasing the filler/binder ratio independent of any increase in the water/solvent ratio and vice versa.

For convenience, the effects of altering the ratio of water/solvent as indicated in the foregoing examples are summarized in the following table:

Table 1

FLOW RATE VERSUS RATIO WATER/SOLVENT

| Formula of | Ratio of Water/Solvent | Flow-rate of Water gpm/sq.ft. at 10 psig (0.018"Thick Sheet) |
| --- | --- | --- |
| Example 1 | 0.955 | 0.4 |
| Example 8 | 1.00 | 1.0 |
| Example 9 | 1.12 | 2.8 |
| Example 7 | 0.955 | 0.8 |
| Example 10 | 1.00 | 2.0 |
| Example 11 | 1.12 | 3.2 |
| Example 12 | 1.25 | 9.0 |
| Example 13 | 1.05 | 8.0 |

In addition to the use of reground microporous material in lieu of a combined portion of the filter and binder ingredients, or an increase in the filler/binder ratio, or an increase in the water/solvent ratio, to provide sub-micron filter media having improved flow-rates or permeability, it has been discovered that variations in the particle size of the thermoplastic polymeric binder will also have an appreciable affect on flow rate. This will be made apparent by the following examples.

EXAMPLE 14

The procedure of Example 8 was repeated with the exception that the thermoplastic resin binder employed was Escambia 6240 having a particle size of about 70% through a 200 mesh screen to produce microporous flat sheet stock from which a filter specimen 0.018 inches thick was prepared. The flow rate of the latter was measured at 5.0 gpm/sq.ft. under a pressure gradient of 10 psig.

EXAMPLE 15

The procedure of Example 8 was once again repeated only this time the thermoplastic resinous binder employed was a propylene modified polyvinyl chloride (Airco 401) having a particle size of 10% through a 200 mesh screen to produce the microporous flat sheet stock from which a filter specimen 0.018 inches thick was obtained. The flow-rate of the latter was measured at 2.5 gpm/sq.ft. under a pressure gradient of 10 psig.

The foregoing Examples 14 and 15 indicate that a decrease in particle size of the binder material will result in an increase in flow-rate. This affect of resin binder particle size on flow-rate is summarized below in Table 2.

the flow-rate of the filter media of Example 1 by 100% without sacrificing efficiency. In order to demonstrate still further that the even greater improvement in flow-rate achieved by the filter media of Examples 8-15 had no appreciable effect on filter efficiency, sample filter specimens corresponding to each of the foregoing Examples were prepared and tested for retentivity in an Air Techniques DOP (Di Octyl Phthalate) "smoke generator" Model Q 127. In this test, DOP aerosols of precisely 0.3 microns size at a concentration of 100 $\mu$g/liter ($2 \times 10^{11}$ particles/cu.ft.) were passed through each filter specimen at a rate of 32 liters/min under a pressure gradient of 5 inches of Hg. The resulting filtrate was then analyzed for content to determine what percentage of the 0.3 microns sized aerosols were removed. For comparison purposes a sample of a well known prior art depth-type sub-micron filter (i.e., Wilkerson 1237-2F) was also tested. The results of the foregoing tests are summarized in Table 3.

Table 3

EFFICIENCY OF FILTER MEDIA IN REMOVING 0.3 MICRONS DOP AERSOLS

| Filter Media Formula | % DOP REMOVAL |
| --- | --- |
| Example 8 | 99.997 |
| Example 9 | 99.996 |
| Example 10 | 99.998 |
| Example 11 | 99.986 |
| Example 12 | 97.000 |
| Example 13 | 99.920 |
| Example 14 | 99.994 |
| Example 15 | 99.996 |
| Wilkerson 1237-2F | 99.997 |

As mentioned above an important objective of the present invention is the provision of sub-micron filter

Table 2

AFFECT OF BINDER PARTICLE SIZE ON FLOW RATE

| Formula of | Ratio of Water/Solvent | gpm/sq.ft. for 0.018"thick sheet under 10 psig | Resin Binder Particle Size |
| --- | --- | --- | --- |
| Example 8 | 1.00 | 1.0 | 20% thru 140 mesh screen |
| Example 14 | 1.00 | 5.0 | 70% thru 200 mesh screen |
| Example 15 | 1.00 | 2.5 | 10% thru 200 mesh screen |

With further regard to the efficiency (retentative capability) of the filter media disclosed herein, Examples 2-5 clearly show that the microporous filter media of the present invention are quite excellent with respect to the efficiency in which they are able to remove sub-micron sized particles such as, for example, bacteria, from a fluid ambient. As indicated by Example 7, it is possible in accordance with the invention to improve media having improved strength characteristics so that they will not be easily damaged during handling or in service. The sub-micron filter media produced in accordance with the above examples were tested for mechanical strength in an Instron tensile strength testing machine in accordance with ASTM test stand No. D882 and the results thereof are listed below in Table 4.

Table 4

MECHANICAL STRENGTH PROPERTIES

| Filter Media Formula | Tensile Strength psi | % Elongation |
| --- | --- | --- |
| Example 1 | 490 | 21.0 |
| Example 8 | 450 | 18.0 |
| Example 9 | 380 | 20.0 |
| Example 7 | 490 | 22.0 |
| Example 10 | 460 | 19.0 |
| Example 11 | 355 | 15.0 |
| Example 12 | 250 | 30.0 |
| Example 13 | 280 | 28.0 |
| Example 14 | 365 | 19.0 |
| Example 15 | 450 | 15.0 |

It will be recalled that an increase in the water/solvent ratio reduces somewhat the mechanical strength of the sub-micron filter media of the present invention. This same result occurs when the silica/resin of filler/binder ratio is increased. Thus, as indicated in Table 4, the sub-micron filter media prepared in accordance with Examples 12 and 13 have the lowest tensile strength of Examples tested albeit still quite satisfactory. By the same token, the filter media of Examples 12 and 13 have the highest % elongation of the tested Examples and this is actually desirable in those circumstances where the filter media are being folded or pleated for use in filter cartridges or other support means inasmuch as the higher % elongation indicates greater flexibility and thus will facilitate such folding or pleating without danger of cracking or splitting the filter media sheet material.

In view of the foregoing it should be apparent that the sub-micron filter media disclosed herein may be fabricated in sheet form in a wide range of thicknesses, and that the resulting microporous filter sheet material may be configured in almost any desired shape such as those already mentioned (i.e., flat sheet or folded or pleated). Thus, for example, the filter material may be shaped and sealed by those methods known in the art for use in cartridge filters or it can be die cut for plate or frame filters with normal paper cutting devices. Other shapes and forms of the filter sheet material disclosed herein and differing means for mounting or supporting the subject filter media will occur to those skilled in the art without departing from the principles of the present invention.

In addition to its quite excellent retentivity, permeability and mechanical strength properties, the sub-micron filter media of the present invention are resistent to oxidation, strong acids, mild alkalis, and alcohols, and can easily withstand heat sterilization thereby rendering same particularly desirable for use in filtering bacteria and other related micro-organisms. Still further, the sub-micron filter media of the present invention being microporous are hydrophillic in nature and thus have the capability of separating suspended nonpolar liquids from polar liquids. For example, a filter or sheet whetted with water will continue to pass water, but will not pass suspended globules or aerosols of oil, benzene, etc.

Accordingly, although several particular end uses to which the sub-micron filter media of the present invention may be applied have been mentioned above for purposes of illustration countless others will be apparent to those of ordinary skill in the art. Consequently, the present invention should not be limited at all in this regard, it being desired that the invention be limited only by the spirit and scope of the claims appended hereto.

I claim:

1. Filter media comprising, a microporous member having at least a pair of opposed surfaces and a predetermined thickness, said microporous member comprising a polymeric resinous matrix having particles of inorganic filler dispersed throughout said matrix and a network of pores formed therein, said pores being formed within said resinous matrix, between said particles of inorganic filler and said resinous matrix, and between neighboring particles of said inorganic filler, said dispersed inorganic filler being present in said member in an amount by weight of at least about 50%, the size distribution of said pores varying non-uniformly across each of said surfaces and across said predetermined thickness through the range of about 0.01 microns to about 100 microns, said microporous member being pervious to the flow of a fluid stream therethrough from one of said surfaces to other of said surfaces and being impervious to particles suspended within said fluid stream, the size of said particles being substantially smaller than the upper limit defining said range of pore size distribution.

2. The article of claim 1 wherein said matrix comprises a polyvinyl chloride resin.

3. The article of claim 1 wherein said particles of inorganic filler comprise silica.

4. The article of claim 1 wherein said microporous member comprises a relatively thin substantially flattened semi-rigid sheet.

5. The article of claim 4 wherein said relatively thin substantially flattened semi-rigid sheet is adapted to be folded to form a pleated filter element.

6. The article of claim 1 further including a relatively high permeable backing member bonded to at least one of said surfaces of said microporous member.

7. The invention defined in claim 1 wherein the size of said particles being at least as small as any of the bacteria selected from the class consisting of escherchia coli, staphylococcus aureus, enterobacteria bacilli, and enterococci.

8. The invention defined in claim 7 wherein said microporous member is capable of removing at least about 99.92% of the total amount of di-octyl phthalate aerosols 0.3 microns in size suspended in a fluid stream upon said fluid stream being passed through said member.

9. The invention defined in claim 7 wherein the rate of flow of said fluid stream through said microporous member ranges from about 0.4 gallons/min./sq. ft. to about 9 gallons/min./sq. ft. when measured under a pressure gradient of 10 psig through a microporous member having a predetermined thickness of about 0.02 inches.

10. The invention defined in claim 9 wherein the tensile strength of said microporous member is greater than 250 lb./sq. in. at an elongation of less than 30%.

11. The filter media of claim 1 wherein said dispersed inorganic filler is present in said member in an amount by weight ranging from about 50% to about 67%.

12. A composition processable into microporous sub-micron filter media comprising a mixture of a polymeric resinous binder, an inorganic filler, said filler being present in an amount by weight ranging from about 1 part per part of binder to about 2 parts per part of binder, a solvent, said solvent being present in an amount by weight ranging from about 1.5 parts per part of binder to about 3 parts per part of binder, and a non-solvent, said non-solvent being present in an amount by weight ranging from about 1 to about 1.3 times the amount of said solvent, said solvent comprising at least 30% of the total composition by weight.

13. The composition of claim 12 wherein said polymeric resinous binder comprises finely divided polyvinyl chloride, and said inorganic filler comprises finely divided silica.

14. The composition defined in claim 12 in which said solvent is selected from the class comprising, acetone, ether, dimethyl formamide, orthochlororobenzene, nitrobenzene, tetrahydrofuran, and such ketones as methyl cychlohexanone, methyl ethyl ketone, and methyl isopropyl ketone.

15. The composition defined in claim 12 in which said non-solvent comprises water.

16. The composition of claim 12 wherein the amount of said non-solvent present in said composition ranges from about 1.05 to about 1.12 times the amount of said solvent by weight.

17. The composition defined in claim 12 wherein the particle size of said resinous binder ranges from about 20% through a 140 mesh screen to about 70% through a 200 mesh screen.

18. The composition of claim 17 wherein the amount of said non-solvent present in said composition is about equal to the amount of said solvent by weight.

19. The composition of claim 12 wherein the amount of said filler present in said composition is about twice the amount of said binder by weight.

20. The composition of claim 19 wherein the amount of said non-solvent present in said composition is about equal to the amount of said solvent by weight.

21. The method of forming microporous sub-micron filter media comprising the following steps:
   a. forming the composition comprising the mixture of a polymeric resinous binder, an inorganic filler, said filler being present in an amount by weight ranging from about 1 part per part of binder to about 2 parts per part of binder, a solvent, said solvent being present in an amount by weight ranging from about 1.5 parts per part of binder to about 3 parts per part of binder; and a non-solvent, said non-solvent being present in an amount by weight ranging from about 1 to about 1.3 times the amount of said solvent, said solvent comprising at least 30% of the total composition by weight;
   b. extruding or molding said composition at room temperature or above to form a substantially flattened sheet;
   c. passing said flattened sheet through an extraction medium to replace said solvent in said sheet with said extraction medium; and
   d. removing said extraction medium from said sheet.

22. The article formed by the method of claim 21 wherein said filter media is capable of removing suspended particles from a fluid stream passed therethrough; the size of said suspended particles being at least as small as any of the bacteria selected from the class consisting of escherchia coli, staphylococcus aureus, enterobacteria bacilli, and enterococci.

23. The invention defined in claim 22 wherein the tensile strength of said filter media is greater than 250 lb./sq. in. at an elongation of less than 30%.

24. The method of forming microporous sub-micron filter media comprising the following steps:
   a. grinding the article defined in claim 23 into finely divided particles,
   b. forming a composition similar to that from which the article of claim 22 was made wherein from about 15% to about 30% of the combined amount of said binder and said filler by weight is replaced by an equal amount of said finely divided particles of said article,
   c. extruding or molding the composition defined in (b) at room temperature or above to form a substantially flattened sheet,
   d. passing said flattened sheet through an extraction medium to replace said solvent in said sheet with said extraction medium; and
   removing said extraction medium from said sheet.

25. The article formed by the method of claim 24.

26. The method of claim 24 wherein the particle size of said ground article is about 90% through a 70 mesh screen.

27. The article formed by the method of claim 26.

28. The method comprising the following steps:
   a. forming a microporous member including a polymeric resinous matrix having particles of inorganic filler dispersed throughout said matrix and pores formed within said matrix, between said particles of inorganic filler and said matrix, and between neighboring particles of said inorganic filler, said dispersed inorganic filler being present in said member in an amount by weight of at least about 50%, with the size distribution of said pores varying non-uniformly through the range of about 0.01 microns to about 100 microns; and
   b. using said microporous member as a fluid permeable filter element to remove suspended particles from a fluid stream, said removed particles being at least as small as any of the bacteria selected from the class consisting of escherchia coli, staphylococcus aureus, enterobacteria bacilli, and enterococci, and wherein said filter element is capable of removing at least about 99.92% of the total amount of di-octyl phthalate aerosols 0.3 microns in size suspended in a fluid stream upon said fluid stream being passed through said filter element.

29. The method of claim 28 wherein step (a) comprises the following steps:
   i. forming the composition comprising the mixture of a polymeric resinous binder, an inorganic filler, said filler being present in an amount by weight ranging from about 1 part per part of binder to about 2 parts per part of binder, a solvent, said solvent being present in an amount by weight ranging from about 1.5 parts per part of binder to about 3 parts per part of binder; and a non-solvent, said non-solvent being present in an amount by weight ranging from about 1 to about 1.3 times the amount of said solvent, said solvent comprising at least 30% of the total composition by weight;
   ii. extruding or molding said composition at room temperature or above to form a substantially flattened sheet;
   iii. passing said flattened sheet through an extraction medium to replace said solvent in said sheet with said extraction medium; and
   iv. removing said extraction medium from said sheet.

30. The method of claim 28 wherein said dispersed inorganic filler is present in said filler in an amount by weight ranging from about 50% to about 67%.

31. A composition processable into microporous submicron filter media comprising a mixture of a polymeric resinous binder, an inorganic filler, a solvent, and a non-solvent, wherein from about 15% to about 30% of the combined amount of said binder and said filler by weight comprises finely divided particles of filter media made from the same composition but without replacing any of the latter's combined binder and filler content.

32. The composition of claim 31 wherein the particle size of said finely divided particles of filter media is about 90% through a 70 mesh screen.

* * * * *